US011981104B2

(12) United States Patent
Schalk et al.

(10) Patent No.: US 11,981,104 B2
(45) Date of Patent: May 14, 2024

(54) DEVICE FOR MANUALLY OR MECHANICALLY PRODUCING A TUBULAR PACKAGING MATERIAL

(71) Applicant: Sprick GmbH Bielefelder Papier-und Wellpappenwerke & Co., Bielefeld (DE)

(72) Inventors: Bastian Schalk, Detmold (DE); Vitali Krebs, Ahlen (DE)

(73) Assignee: Sprick GmbH Bielefelder Papier-und Wellpappenwerke & Co., Bielefeld (DE)

(*) Notice: Subject to any disclaimer, the term of this patent is extended or adjusted under 35 U.S.C. 154(b) by 682 days.

(21) Appl. No.: 16/881,941

(22) Filed: May 22, 2020

(65) Prior Publication Data

US 2020/0282687 A1 Sep. 10, 2020

Related U.S. Application Data

(63) Continuation of application No. PCT/EP2018/078784, filed on Oct. 19, 2018.

(30) Foreign Application Priority Data

Nov. 24, 2017 (DE) ......................... 102017010909.5

(51) Int. Cl.

*B31D 5/00* (2017.01)
*B65H 16/00* (2006.01)
*B65H 16/02* (2006.01)

(52) U.S. Cl.

CPC ......... *B31D 5/0069* (2013.01); *B65H 16/005* (2013.01); *B65H 16/028* (2013.01);
(Continued)

(58) Field of Classification Search

CPC ............... B65H 16/005; B65H 16/028; B65H 2402/43; B65H 2701/1944; B31D 5/0069;
(Continued)

(56) References Cited

U.S. PATENT DOCUMENTS 4,524,895 A * 6/1985 Lunden .............. A47K 10/3818 225/106
5,439,521 A * 8/1995 Rao .................... A47K 10/3827 242/598.6

(Continued)

FOREIGN PATENT DOCUMENTS

AU 2011 202 898 A1 7/2011
DE 20 2012 009 025 U1 2/2013

(Continued)

OTHER PUBLICATIONS

International Search Report and Written Opinion of the International Search Authority dated Mar. 22, 2019 in International Application No. PCT/EP2018/078784 (English and German languages) (17 pp.).

(Continued)

*Primary Examiner* — Andrew M Tecco
*Assistant Examiner* — Nicholas E Igbokwe
(74) *Attorney, Agent, or Firm* — Banner & Witcoff Ltd.

(57) ABSTRACT

A device for manually or mechanically producing a tubular packaging material of a paper web is wound to form a roll, which forms an internal cavity, from which the paper web can be drawn to form packaging material. The device includes a receptacle for at least partially circumferentially encompassing the roll and an axial holder for holding an end face of the roll. The axial holder has a wall, in which a dispensing opening for dispensing the packaging material in an axial dispensing direction is formed. The wall has an inner guide contour, which tapers in a funnel-like manner in
(Continued)

the axial dispensing direction from the receptacle to the dispensing opening. The wall is provided with at least one front axial recess at a front end of the axial holder in the axial dispensing direction.

21 Claims, 6 Drawing Sheets

(52) U.S. Cl.
CPC ................ *B31D 2205/0029* (2013.01); *B31D 2205/0047* (2013.01); *B31D 2205/0058* (2013.01); *B31D 2205/007* (2013.01); *B31D 2205/0082* (2013.01); *B65H 2402/43* (2013.01); *B65H 2701/1944* (2013.01)

(58) Field of Classification Search
CPC .... B31D 2205/0047; B31D 2205/0058; B31D 2205/007; B31D 2205/0082
See application file for complete search history.

(56) References Cited

U.S. PATENT DOCUMENTS

2012/0175455 A1* 7/2012 Denis ................. A47K 10/3818 242/594
2012/0256037 A1* 10/2012 Nordlund ........... A47K 10/3818 242/560
2015/0273784 A1* 10/2015 Schmid ................ B65H 35/008 242/562
2016/0227971 A1* 8/2016 Granger ................. A47K 10/40
2017/0305652 A1* 10/2017 Giesen ................. B65D 85/671
2018/0194582 A1* 7/2018 Rozek .................... A47K 10/38

FOREIGN PATENT DOCUMENTS

EP 0 091 411 A1 10/1983
WO WO 2006/047696 A2 5/2006

OTHER PUBLICATIONS

Office Action dated Jun. 18, 2018 for German Patent Application No. 10 2017 010 909.5, (9 pp.).
International Search Report and Written Opinion of the International Search Authority dated Mar. 22, 2019 in International Application No. PCT/EP2018/078784 (English and German languages) (25 pp.).
International Preliminary Report on Patentability dated May 26, 2020 in International Application No. PCT/EP2018/078784 (English and German languages) (10 pp.).

* cited by examiner

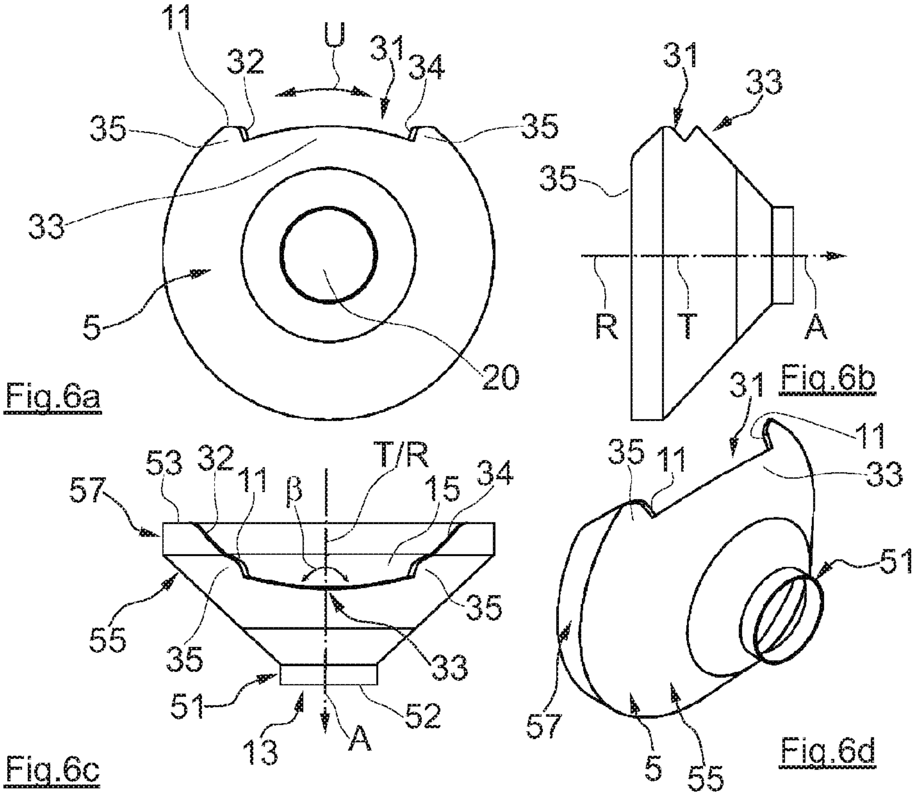
11
32
U
31
34
35
35
33
5
20
Fig.6a
31
33
35
R
T
A
Fig.6b
57
53
32
11
β
T/R
15
34
55
35
35
33
51
13
A
52
Fig.6c
31
11
35
11
33
51
57
5
55
Fig.6d
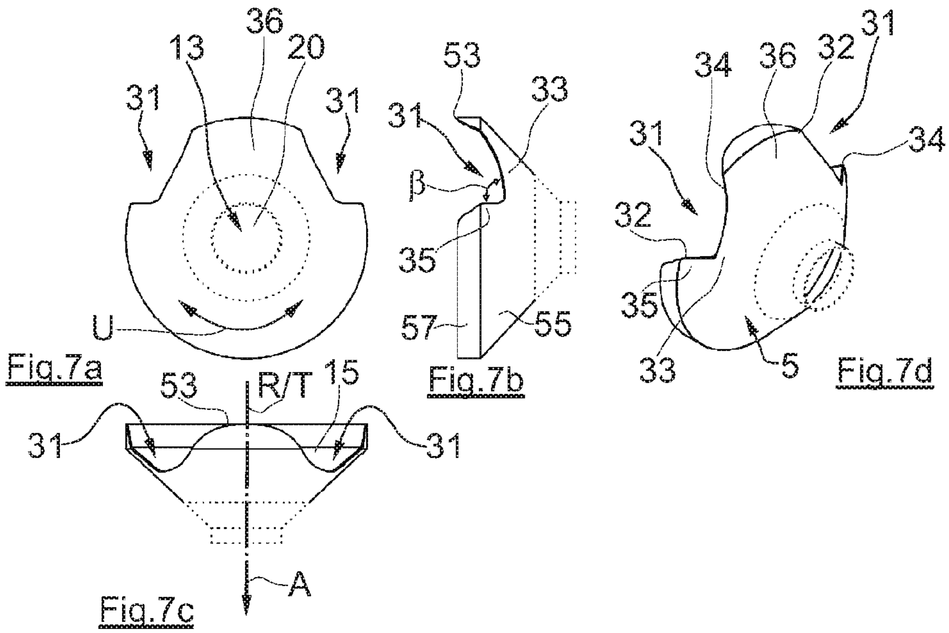
36
13
20
31
31
U
Fig.7a
53
31
33
β
35
57
55
Fig.7b
31
34
36
32
31
34
32
35
33
5
Fig.7d
53
R/T
15
31
31
A
Fig.7c

DEVICE FOR MANUALLY OR MECHANICALLY PRODUCING A TUBULAR PACKAGING MATERIAL

PRIORITY

This application is a continuation application of International PCT Patent Application No. PCT/EP2018/078784 filed on Oct. 19, 2018, entitled "DEVICE FOR MANUALLY OR MECHANICALLY PRODUCING A TUBULAR PACKAGING MATERIAL," which claims priority to German Patent Application No. 10 2017 010909.5 filed on Nov. 24, 2017, the entire contents of both of which are incorporated herein by reference.

TECHNICAL FIELD

The invention relates to a device for manually or mechanically producing a tubular packaging material of a paper web wound to form a roll, which forms an internal cavity, from which the paper web can be drawn to form the packaging material.

BACKGROUND

A generic packaging material dispenser is known from DE 20 2012 009 025 U1. The packaging material dispenser comprises a receptacle comprising an axial holder, which is fastened thereto and into which a paper web roll can be inserted. The axial holder is realized as conical dispensing funnel comprising a tapering inner contour. The receptacle is formed by means of a half shell. The rotationally symmetrical dispensing funnel comprising a conical inner and outer contour is arranged at the front end of the half shell. Cylindrical tube-like fastening sections of a constant diameter are provided at the front and rear end of the frustoconical dispensing funnel. A toothed ring can be provided at the front end of the dispensing funnel as tear-off aid. In the case of the packaging material dispenser, the base material for the tubular packaging material is a paper web, which is wound to form a roll and which is inserted into the receptacle and encompasses the roll. The roll has an inner cavity, from which the paper web can be drawn to form spiral and tubular packaging material. The packaging material roll, the half shell, the frustoconical dispensing funnel, and the dispensing opening thereof are all arranged coaxially to one another. The known packaging material dispenser is extremely popular, because it can be operated without maintenance, can be used easily, and is very well suited, for small mail-order companies, to produce packaging material for filling cavities in shipping containers in a cost-efficient and uncomplicated as well as space-saving and environmentally friendly manner. If so many packages are filled with packaging material by means of the manual packaging material producing device that the paper web roll is depleted, the packing personnel can simply add a new roll.

It has been shown, however, that inexperienced or untrained packing personnel occasionally handles the packaging material dispenser improperly and can thus sustain scratches in the area of the hands and forearms. Especially when inserting packaging material web rollers into the receiving shell of the dispenser and when drawing spiral packaging material web tubes from the inner cavity of the paper web roll, it can happen occasionally that users collide with the axial holder or components attached thereto, for example the cutting ring. If the paper web is improperly inserted into the receptacle or is improperly drawn, the paper web can moreover rip or tear off in an undesired manner, which compromises the quality of the tubular packaging material or can lead to undesirable high scrape quantities.

It is thus an object of the invention to overcome the disadvantages of the prior art, to provide a device for manually or mechanically producing a tubular packaging material of a paper web wound to form a roll, the use of which is simplified for untrained packing personnel, in order to reduce the risk of injuries and material damages in this way, when inserting and drawing the paper web.

SUMMARY

This object is solved by means of the subject matter of independent claims 1, 8, and 13.

According to a first aspect of the invention, a device for manually or mechanically producing a tubular packaging material of a paper web wound to form a roll is thus provided, which forms an inner cavity, from which the paper web can be drawn to form the packaging material. A tubular packaging material can also be referred to as three-dimensional packaging material. A three-dimensional packaging material can be brought from a two-dimensional, flat, web-shaped base material in the form of a paper web roll, into a three-dimensional structure, which has at least one deformable cavity, in order to provide a damping and cushioning function. A deformable cavity of this type can extend in the longitudinal direction of the packaging material. This can be referred to as a tubular packaging material in this respect. The packaging material tube can be stabilized, for example with stamping, or can simply be torn off without stabilization. A roll can be provided, for example, the axial length of which is at least half as large as the outer diameter thereof and/or the axial length of which is maximally twice as large as the outer diameter thereof. The ratio of axial length to outer diameter of the roll can be larger than 0.75, larger than 1, and/or smaller than 1.75, in particular 1.5. The ratio of axial length to outer diameter of the roll can, for example, be approximately 1.25. In the new state, the inner diameter of the roll can be smaller than half of the outer diameter. In the new state of the roll, the inner diameter may be larger than 1 cm, larger than 5 cm, or larger than 10 cm, and/or smaller than 25 cm, smaller than 20 cm, or smaller than 17.5 cm. An inner diameter of a new roll can, for example, be approximately 16 cm.

The device according to invention comprises a receptacle for at least partially circumferentially encompassing the roll, and an axial holder for holding an end face of the roll, wherein the axial holder has a wall, in which a dispensing opening for dispensing the packaging material in an axial dispensing direction is formed. The wall has an inner guide contour, which tapers in a funnel-like manner in the axial dispensing direction from the receptacle to the dispensing opening. The receptacle and the guide funnel can be formed, for example, as thin-walled plastic part with a wall thickness of less than 5 mm, as in the case of the device described in DE 20 2012 009 025 U1 for manually producing a spiral packaging material, the entire content of which is added by reference to the present application. The receptacle can have a constant, cylindrical half shell-shaped cross section in the course along the roll axis. A cylindrical half shell-shaped receptacle has an inner diameter, which essentially corresponds (+0 . . . 10%) to the outer diameter of the inserted roll. The receptacle can have a constant wall diameter in the course along the roll axis. In the axial direction of the roll, the receptacle is formed to be free from a resistance, free from an axial movement limitation for the roll, in addition to the axial holder in the dispensing direction. At its end located opposite the axial holder or spaced apart from the axial holder by at least one roll length, respectively, the axial holder can have a lock and/or an axial stop for holding the roll. According to one embodiment, the receptacle comprises exactly one first roll. In the alternative or additionally, the receptacle can have a shell body, which is formed essentially semi-cylindrically and/or which defines a longitudinal receiving axis, which is aligned, so as to correspond to, or aligned with, the dispensing direction and/or so as to correspond to, or aligned with, the roll axis of the roll. The receptacle can have a shell body, for example made of plastic, with a small wall thickness of less than 5 mm. The shell body of the receptacle is dimensioned with an inner diameter, which is at least as large as the outer diameter of a roll, which is provided for equipping the device. The inner diameter of the receptacle has a size of at least 20 cm, at least 25 cm, or at least 30 cm. The inner diameter of the receptacle may be smaller than 100 cm, in particular smaller than 50 cm, because rolls with such a large outer diameter are impracticable to handle. A shell body can also have a different shape than a semi-cylindrical form, for example a V-shaped cross section or a polygonal cross section. It is also conceivable that the receptacle is formed by at least two struts, which extend in the direction of the dispensing direction and on which rolls can lie. A receptacle can comprise several struts extending in the dispensing direction or transversely to the dispensing direction, in order to encompass a packaging material web roll circumferentially at least partially. A longitudinal receptacle axis can also be a receptacle formed by rails and/or struts.

According to the first aspect of the invention, the wall is provided with at least one front axial recess at a front end of the axial holder in the axial dispensing direction, which extends at least 10 mm in the axial dispensing direction, starting at the front end of the axial holder. The axial recess, which is incorporated into the wall with the guide contour, which tapers in a funnel-like manner in the axial dispensing direction and which extends from the front, narrow end of the axial holder, makes it easier for the packing personnel to access the interior of the packing material dispenser. In the area of the dispensing opening, it provides additional space for the hand and the arm of the user, so that said user can access more the packaging material dispenser more easily, and the risk of a collision with the packaging material dispenser is reduced. The axial recess can simultaneously provide a tear-off aid, which can be operated particularly easily. Due to the relatively large dimensioning of the axial recess according to the first aspect of the packaging material dispensing device according to the invention, the risk of injury is significantly reduced as compared to a packaging material dispenser comprising a ring blade or the like. The packaging material producing device is free from a cutting ring, such as a metallic toothed ring. The axial holder is free from metal. The receptacle can be free form metal. The axial holder and/or the receptacle may include plastic. The device for manually or mechanically producing a tubular packaging material can have a wall, which is provided with exactly one, two, three, four, five, six or more axial recesses. In the case of a device comprising several front axial recesses, the individual axial recesses are equally large, uniform and/or dimensioned identically. The use of several front axial recesses improves the operability of the device from different directions.

According to one embodiment of a device for manually or mechanically producing a tubular packaging material, the wall for forming the at least one front axial recess bifurcates in the circumferential direction (i.e. circumferentially) and transversely to the axial dispensing direction. The axial recess bifurcates in such a way that the width of the front axial recess increases transversely to the axial dispensing direction in the course of the axial recess in the axial dispensing direction. The at least one front axial recess can have a narrow root area, which forms the start of the axial recess on the side of the receptacle and, starting from said root section, the axial recess widens increasingly so as to progress in the axial direction, to the axial dispensing direction in the circumferential direction. The front axial recess or access and/or tear-off recess can be formed in such a way that, in the direction opposite to the axial dispensing direction, the axial dispensing recess becomes increasingly narrower and is particularly narrow in its root area, in order to form a clamping area there. The tubular packaging material drawn from the inner cavity of the roll can be clamped in the clamping area, in order to sever it in portions with the help of increased frictional resistance and to thus separate packaging material units for insertion into a packaging container, such as boxes. A device, in the case of which the at least one front axial recess is formed with a clamping area on the side of the receptacle, allows for a particularly simple tear-off handling of the packaging material dispenser, wherein the front end is retained in the clamping area of the front axial recess so as to still be in contact with the packaging material located below, after the severing of a packaging material section. The packaging material held in a clamping area of an axial recess can be grabbed easily by the user to produce a next packaging material web unit, whereby there is no risk of injury, and more packaging material can be drawn from the roll inside, in order to produce a second or further packaging material piece.

According to a further development of a device for manually or mechanically producing a tubular packaging material, the at least one front axial recess defines an acute opening angle at least in a rear clamping section in the axial dispensing direction. An acute opening angle is generally smaller than 90° and can be dimensioned to be smaller than 45°, smaller than 30°, or smaller than 15°, and particularly smaller than 10°, in order to ensure a strong clamping and/or tear-off function.

According to another embodiment, which can be combined with the previous one, the outer edges of the wall located opposite one another in the circumferential direction limit the front axial recess in such a way that they run in a curved, continuously rounded manner, that the circumferential width of this axial recess increases continuously in the axial dispensing direction. The outer edges of the wall are shaped convexly in such a way. The rear area of the outer edges in the axial direction can form a small, infinitesimal distance between the outer edges located opposite one another in the circumferential direction. The outer edges located opposite one another can reach a largest possible distance from one another in the front end area of the dispensing opening. In a plane perpendicular to the axial dispensing direction, the circumferential width can be defined as shortest distance of opposite wall outer edges. Wall edges rounded in such a way have a particularly low injury potential and prevent an undesired premature tear-off of the packaging material.

According to another embodiment, the front end of the axial receptacle can be formed by continuously rounded wall edges, wherein outer edges adjoining one another transition into one another continuously, with constant curvature, from two respective adjacent front axial recesses. In the case of a device of this type, the wall sections extend in a petal-like or beak-shaped manner, respectively, between two respective directly adjacent front axial recesses in the axial dispensing direction. A device for producing a tubular packaging material according to the first aspect of the invention comprising exactly two front axial recesses, which are arranged so as to be offset by 180° in the circumferential direction at the rim of the dispensing opening, and the outer edges of which curve forward in the circumferential direction, starting at a rear clamping section in the axial direction and transition into one another, can be referred to as beak-shaped output.

According to another embodiment of a device, the inner guide contour of the wall runs continuously in the axial dispensing direction, starting at the front end of the axial holder in the axial dispensing direction, to the receptacle, so as to connect directly to the receptacle. The course of the inner guide contour, which is continuous in the axial dispensing direction, is free from jumps, kinks and/or edges. In the axial dispensing direction, the inner guide contour can run linearly section by section and/or can run with a curvature section by section. The curvature extending in the axial direction has a radius of curvature, which is at least 1 cm, at least 2 cm, in particular at least 5 cm or at least 10 cm. In the case of a smaller radius of curvature, below 0.5 cm, a continuous course can no longer be assumed. Sections, which are linear in the axial dispensing direction and which are curved in the axial dispensing direction, transition continuously into one another, free from steps, free from kinks and/or free from jumps. In the case of a transition between a curved and a linear section, the alignment of the linear section corresponds to a tangent at the end of the curved section. It is also conceivable that a curved section with a first radius of curvature transitions continuously into a curved section with a second, different, radius of curvature in the axial dispensing direction. The radius of curvature can be larger in the first curved section than in the second curved section. The transition area between two curved sections has a curvature transition, which continuously adapts from the one to the other radius of curvature.

According to another embodiment of a device, maximally seven axial recesses are arranged at the front end of the axial holder in the axial dispensing direction. Maximally five, in particular maximally two or three, front axial recesses can be arranged at the front end of the axial holder in the axial dispensing direction. Exactly one front axial recess can be provided at the front end of the axial holder in the axial dispensing direction. The advantage according to the invention can already be realized with only a single front axial recess. It can be advantageous to provide several front axial recesses, in order to ensure a simple, high-quality, and quick tear-off from different directions. Surprisingly, it turned out that a further advantageous change can no longer be attained by providing additional front axial recesses. On the contrary, it turned out to be disadvantageous, because each further axial recess increases the likelihood that the user does not glide with the spiral paper packaging material, which is to be torn-off, into an axial recess when quickly or carelessly handling the device, respectively, but contacts a beak-shaped wall area between two adjacent axial recesses.

According to a second aspect of the invention, a device, which can be designed as described above, for manually or mechanically producing a tubular packaging material of a paper web wound to form a roll is provided, which forms an inner cavity, from which the paper web can be drawn to form the packaging material and which defines a roll axis. According to the second aspect of the invention, the device comprises a receptacle for at least partially circumferentially encompassing the roll, and an axial holder for holding at the roll, wherein the axial holder has a rounding, in which a dispensing opening for dispensing the packaging material in an axial dispensing direction is formed, wherein the wall has an inner guide contour, which tapers in a funnel-like manner in the axial dispensing direction from the receptacle to the dispensing opening. According to the second aspect of the invention, the axial dispensing direction thereby runs at an angle relative to the roll axis. In other words, the wall and the front end thereof in the axial direction, which defines the dispensing opening, is formed in such a way that the axial dispensing direction, which runs through the center of the dispensing opening and which lies at right angles on the base area spanned by the dispensing opening, runs at an angle relative to the roll axis or skewed to the roll axis. As described above, the roll axis is designed according to the central axis of a shell-shaped receptacle for encompassing the paper web roll. The alignment of the axial dispensing direction lies transversely to the roll axis, which runs through the tubular inner cavity of the paper web roll, so that the access of the user to the delivery funnel as well as optionally to the paper web roll inner cavity is simplified, when the dispensing device is arranged laterally of the packaging workspace of the user. This facilitates the access of the user to the interior of the packaging material dispenser or to the inner cavity of the roll, respectively, so that the risk of injury is reduced significantly when accessing, when grabbing an end of a new paper web. In particular sharp-edged cutting devices, such as a toothed ring, are not provided at and/or in the dispensing opening, so that a risk of injury is almost completely ruled out. It is conceivable to orient the axial dispensing direction at a predetermined dispensing angle relative to the roll axis, when the axial holder, together with the roll, defines the roll axis. A dispensing angle of, for example, between 0° and 90° transversely to the roll axis can be defined. The dispensing angle lies between 5° and 45°. Particularly, a dispensing angle of between 10° and 20° can be defined. In the case of a predetermined fastening of the packaging material dispenser at a packaging workspace, one of the above-mentioned or another area can particularly be defined for a dispensing angle between the axial dispensing direction and the roll axis. At the front end area of the axial holder, the wall can have a collar area and/or beak tip area, which extends essentially exclusively in the axial direction. The above-described front axial recesses can be introduced into such a beak tip area of the wall, which extends in the axial direction.

According to another embodiment of the device for producing a tubular packaging material, the wall defines a funnel axis with the inner guide contour, which tapers in a funnel-like manner, wherein a funnel opening angle of at least 15° and/or maximally 75° is spanned between the funnel axis and the inner guide contour. The funnel opening angle can span at least 30° and/or maximally 60°. A funnel opening angle can particularly be provided in the range of between 40° and 50°, 45°. With respect to the inner guide contour, the funnel axis runs centrally through the inner guide contour, which tapers in a funnel-like manner, as rotationally symmetrical axis and/or mirror-symmetrical axis.

According to another embodiment of the device, the funnel axis runs at an angle relative to the roll axis. As described above with regard to the first aspect of the invention, the inner guide contour of the wall, which tapers in a funnel-like manner, can have different shapes. For example, it can be conical, frustoconical, pyramid-shaped, elliptical, convexly, or concavely curved, etc. The inner contour, which tapers in a funnel-like manner, can be shaped rotationally symmetrically and/or mirror-symmetrically, in order to simplify the manufacture or assembly. A center line of the wall of the dispensing funnel or of the tapering inner contour thereof, respectively, can define the funnel axis. The funnel axis can run according to the axial dispensing direction. The dispensing opening can be coaxial to the dispensing funnel. In the case of a device comprising a funnel axis, which runs transversely to the roll axis, an unintentional slide-out of the inner windings of a paper web roll all the way to a narrowest inner diameter can be realized, which is significantly narrower than the secured inner diameter of a paper web roll, which is realized on a completely rotationally symmetrical funnel with coaxial alignment of the funnel. Several windings and thus a larger paper web supply can be provided thereby, which simplifies the use to the effect that paper web material has to be refilled less often and whereby undesired scrape caused by unintentional slide-out is avoided in an improved manner.

According to another embodiment of the second aspect, the axial dispensing direction, which intersects the dispensing opening in the center, is arranged offset and/or at an angle relative to the funnel axis. In the case of this embodiment, the funnel axis can be arranged transversely to the roll axis, and the output can be arranged transversely to the roll axis as well as to the funnel axis in the axial direction. Angular positions, which are predetermined, for example, with respect to a packaging workspace, for paper web rolls, funnel axis and/or dispensing material can be configured in this way for dispensing material, in order to optimally hold the packaging material roll in the receptacle against the axial holder, in order to ensure a good forming behavior from the paper web roll into a tubular, spiral packaging material when drawing the paper web from the inner side of the paper web roll, and/or in order to ensure an alignment of the axial dispensing direction, which is particularly favorable with respect to the packaging workspace. The axial dispensing direction can run, for example axially offset in parallel relative to the funnel axis.

According to another embodiment of a device for manually or mechanically producing a tubular packaging material, which can be combined with the previous ones, the dispensing opening, which is surrounded completely by the wall, can form a circular passage surface and/or star-shaped passage surface, perpendicular to the axial dispensing direction, which is arranged eccentrically relative to the roll axis. The dispensing opening can be arranged eccentrically in such a way that the roll axis does not intersect the passage surface. An embodiment of this type has turned out to be particularly favorable for a good and simple removal of the packaging material from the inner side of the packaging material paper web roll, and simultaneously makes it possible to use rolls comprising a very narrow inner cavity, without said rolls unintentionally sliding out of the packaging material dispenser.

A third aspect of the invention, which can be combined with the previous ones, relates to a device for manually or mechanically producing a tubular packaging material of a paper web wound to form a roll, which forms a cavity, from which the paper web can be drawn to form a packaging material. The device comprises a receptacle for at least partially circumferentially encompassing the roll, and an axial holder for holding an end face of the roll, wherein the axial holder has a wall, in which a dispensing opening for dispensing the packaging material in an axial dispensing direction is formed. The wall has an inner guide contour, which tapers in a funnel-like manner in the axial dispensing direction from the receptacle to the opening. The wall is provided with at least one rear axial recess at a rear end of the axial holder in the axial dispensing direction, which extends at least 10 mm in the axial dispensing direction, starting at the rear end of the axial holder. The rear axial recess or axial insertion recess forms a pocket-like indentation at the rearward end, which faces the receptacle, of the, for example, ring-shaped rear side of the wall. The axial insertion recess or rear axial recess, respectively, according to the third aspect of the invention simplifies the handling of the packaging material dispenser, in that it creates a free space, without compromising the support function of the axial holder for the end face of the roll. When inserting a new paper web roll into the device, the user can access the free space, in order to bring the paper web roll into contact with the inner side of the axial holder on the end face, without his hand colliding with the axial holder. Scrapes on the hand of the packing personnel when inserting new paper web rolls into the device as well as damages to the paper web roll, which could occur if a user lets the paper web roll drop into the receptacle for fear of scrapes, are avoided in this way.

According to another embodiment of the third aspect, the rear axial recess has an obtuse opening angle in a front base section in the axial dispensing direction. An obtuse opening angle can generally identify an angle of larger than or equal to 90°. The width of the opening angle lies in the range of between 90° and 180°. Particularly, the opening angle is larger than 120° or larger than 145°. Particularly, an obtuse opening angle of larger than 160° can be selected. An obtuse opening angle in the front base section of the axial insertion recess at the rear end of the axial holder, wherein the area, at which the opening angle extends, is at least 3 cm wide, at least 5 to 10 cm wide, allows for a secure access when inserting a paper web roll into the interior of the axial holder by avoiding a pinching or tear-off risk.

According to another embodiment, the wall limiting the at least one rear axial recess has at least one step, which protrudes in the circumferential direction, between the base section and the rear end of the axial holder. With regard to a predetermined outer dimensioning of the packaging material web roll, the step is predetermined. With regard to the packaging material web roll, which is to be inserted, the step can be selected in such a way that, when centrally inserting the roll axis into the receptacle and fastening the axial holder to the receptacle, the step extends farther transversely to the axial roll direction or roll axis, respectively, than the outer diameter of the roll. A design of this type is advantageous when the device has two or more rear axial recesses, which facilitate the insertion from different directions, wherein a weakening of the wall due to the several axial recesses is at least partially compensated by providing steps to support the roll. A rib can extend in the direction of the funnel axis, in particular on the outer side, in the axial direction, parallel to a funnel axis. An axial direction holder can be equipped with two, three or several ribs.

According to another embodiment of a device for producing a spiral tubular packaging material, the at least one rear axial recess has an access section, which extends over at least 10 mm in the axial direction and in which the rims of this rear axial recess, which are located opposite one another in the circumferential direction, are spaced apart from one another by no less than 50 mm, no less than 100 mm in the circumferential direction. According to this embodiment, the rear axial recess, which extends in the axial direction, is limited in the circumferential direction by rims, which extend in the axial direction and which are sufficiently spaced apart from one another in order to allow for a safe access by packing personnel.

According to another embodiment of a device according to the first, second, and/or third aspect of the invention, the device comprises at least two, three, four or more front and/or rear axial recesses. The number of front axial recesses and/or of rear axial recesses can be independent of one another. The at least two (front and/or rear) axial recesses are in each case arranged rotationally symmetrically or mirror-symmetrically to one another, in particular with respect to the roll axis, funnel axis, and/or axial dispensing direction.

According to another embodiment, which can be combined with the previous ones, and which optionally refers to the first, second and/or third aspect of the invention, the at least one front and/or rear axial recess extends at least 20 mm, at least 50 mm or at least 75 mm and/or maximally 200 mm, maximally 150 mm or maximally 100 mm in the axial dispensing direction. In the case of the embodiment, in which the axial dispensing direction differs from the alignment of the roll axis, it can be defined that the rear axial recess extends at least 20 mm, at least 50 mm or at least 75 mm and/or maximally 200 mm, maximally 150 or maximally 100 mm in the direction of the roll axis. It turned out that a dimensioning of this type of the front and/or rear axial recess ensures a significant improvement in the handling by untrained operating personnel, without compromising the stability of the device.

According to another embodiment of the invention according to the first, second, and/or third aspect of the invention, the at least one front and/or rear axial recess extends at least in some sections in a radial direction transversely to the axial dispensing direction. In the alternative, it is conceivable that the front and/or rear axial recess extends exclusively in the axial dispensing direction, and/or that the rear axial insertion recess extends exclusively in the direction of the roll axis. At the front end of the axial holder, the wall can form a sleeve section or collar section, the base cross section of which transversely to the axial dispensing direction is constant, for example hollow-cylindrically. This base cross section can correspond to the passage cross section of the dispensing opening. At the rear end of the axial holder, the wall can form a second sleeve section, which can be formed according to the axial holder. The rear sleeve section can be formed so as to have a complementary form to a, for example, semi-cylindrical shell-shaped receptacle.

In the axial dispensing direction or in the direction of the front axis, respectively, the front, first sleeve section and/or the rear, second sleeve section can connect directly and/or with the same cross section, to the funnel section of the axial holder, wherein the cross section of the funnel section, of the sleeve section, and/or of the rear sleeve section can be rotationally symmetrical. The axial stop can include the funnel section and the sleeve section and optionally of the second sleeve section. The wall may form a funnel section, in which the inner guide contour tapers continuously, in particular frustoconically or in the shape of a truncated pyramid in the axial dispensing direction or in the direction of the funnel axis, respectively. The axial holder is injection molded in one piece, in particular of plastic. The axial holder can have a wall, of a constant wall thickness. The inner contour of the axial holder can be parallel to the outer contour of the axial holder.

If the axial holder is designed with a first sleeve section or a second sleeve section, the front and/or rear axial recess can extend exclusively in the front or rear sleeve section, respectively, which extends axially. It is conceivable that the front and/or rear axial recess extends in a front or rear sleeve section, respectively, of the axial holder as well as in a funnel section of the axial holder, which extends transversely to the output of the axial direction or of the funnel axis, respectively.

According to another embodiment of a device for producing a tubular packaging material, which can be realized with first, the second, and/or the third aspect of the invention, the axial holder can define an essentially rectangular and/or at least partially rounded funnel base cross section in its entry area on the receptacle side, for example the rear sleeve section. The form of the funnel base cross section can be configured so as to be constant essentially along the funnel axis with a different width, which decreases according to the funnel tapering. The funnel cross section can for example be rectangular and the inner contour of the funnel section can form a pyramid or truncated pyramid-shaped inner contour according to the funnel base cross section. In the alternative, the funnel base cross section can be cylindrical or oval, respectively, and the funnel inner contour can be formed frustoconically or conically according to the circular and/or oval funnel base cross section. It is conceivable that a funnel base cross section has two lateral edges, which abut against one another in particular at right angles and which are connected by means of a quadrant-shaped section at their corners, which are spaced apart from one another. In the alternative, short linear edge sections can be provided between two lateral edges of a funnel base cross section, which are rectangular to one another, and a quadrant-shaped curve section located opposite to the tip, starting at the ends of the two elongate base sides. Other designs are conceivable.

According to a special embodiment of a device according to the invention for manually producing a spiral tubular packaging material, the device is free from a drive, such as an electrical drive, for conveying the packaging material and/or the paper web. According to this embodiment, the device is free from being motor-driven, such as electric-motor operated conveying means, such as conveying rollers. In the case of this embodiment, the device is further free from being motor-driven, such as electromotive, operated separating means, such as a cutting device, for example scissors, a guillotine, or the like.

According to another embodiment of a device for mechanically producing a packaging material, the device comprises conveying means, such as conveying and/or deforming rollers, for conveying the packaging material and/or the paper web, as well as an electrical drive for operating these conveying means. In the case of this embodiment, the device can optionally have an electrically operated separating means, such as a cutting device, for example scissors, a guillotine, a rotary cutter, or the like for severing a cushioning material unit, such as a cushion pad, from the tubular packaging material.

Further embodiments of the invention can be gathered from the subclaims. Further characteristics, advantages, and features of the invention become clear from the following description of embodiments of the invention on the basis of the enclosed drawings, in which:

BRIEF DESCRIPTION OF THE DRAWINGS

FIG. 6*a* shows a front view of an axial holder for a packaging material dispensing device according to a sixth embodiment according to the invention;

FIG. 6*b* shows a side view of the axial holder according to FIG. 6*a;*

FIG. 6*c* shows a top view onto the axial holder according to FIG. 6*a;*

FIG. 6*d* shows a perspective view of the axial holder according to FIG. 6*a;*

FIG. 7*a* shows a front view of an axial holder for a packaging material dispensing device according to a seventh embodiment according to the invention;

FIG. 7*b* shows a side view of the axial holder according to FIG. 7*a;*

FIG. 7*c* shows a top view onto the axial holder according to FIG. 7*a;*

DETAILED DESCRIPTION

Figure 1A:
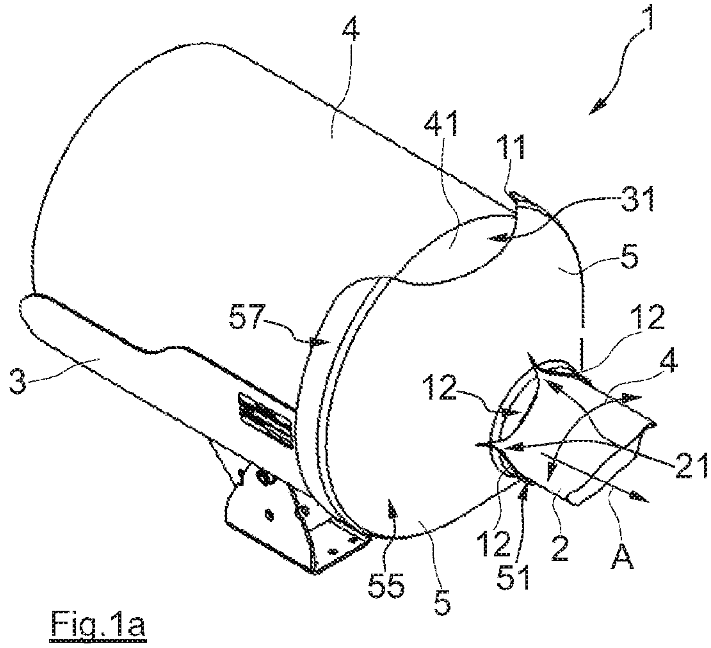
FIG. 1*a* shows a perspective view of a packaging material dispensing device according to the invention according to a first embodiment.

To simplify legibility and clarity, the same or similar reference numerals will be used below for the same or similar components of the different embodiments of packaging material dispensing devices according to the invention.

A packaging material dispenser according to the invention or a device according to the invention, respectively, for manually or mechanically producing a tubular packaging material is provided below in general with reference numeral 1. The device 1 according to the invention for manually or mechanically producing a tubular packaging material 2 of a roll 4 comprises a receptacle 3 as main component for at least partially encompassing the roll 4 in the circumferential direction U as well as an axial holder 5 for holding the end face of the roll 4.

The axial holder 5 has a wall 11, in which a dispensing opening 13 for dispensing the packaging material 2 in an axial dispensing direction A is formed. On the inner side, the wall 11 has an inner guide contour 15, which tapers in a funnel-like manner, from the receptacle 3 in the direction of the dispensing opening 13. The inner guide contour 15, which tapers in a funnel-like manner, defines a funnel axis T. A funnel opening angle θ of 45° as an example here, is spanned between the funnel axis T and the inner guide contour (15). The funnel opening angle θ can generally be in a range of between 10° and 80°, whereby a range of between 30° and 60° can be utilized. Deviating from the rotationally symmetrical frustoconical shape illustrated in FIGS. 1*b* and 1*c* with constant funnel opening angle θ, a funnel opening angle θ, which is variable in the circumferential course, can certainly be realized (as can be seen, for instance, in the case of FIGS. 10*a-c* and 11*a-c*). It is also conceivable that the funnel opening angle θ has a funnel opening angle θ, the course of which is thus variable in the axial funnel direction, for example in the case of a tapering, which is progressive, degressive or which differs from axial section to axial section. The paper web may be wound to form a roll 4 and from the inner cavity of which the paper web can be drawn to form a packaging material 2, defines a roll axis R. The roll axis R, the funnel axis T, and the axial dispensing direction A may be aligned coaxially with one another, such as, for example, in the case of the first embodiment according to the invention illustrated in FIGS. 1*a* to 1*d*.

Figure 1B:
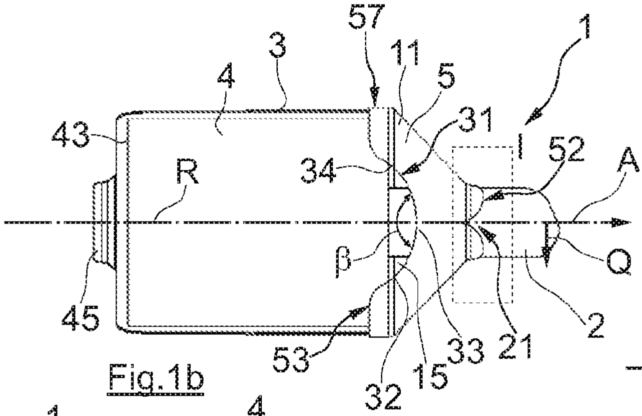
FIG. 1*b* shows a top view onto the device according to FIG. 1*a;*
Figure 1D:
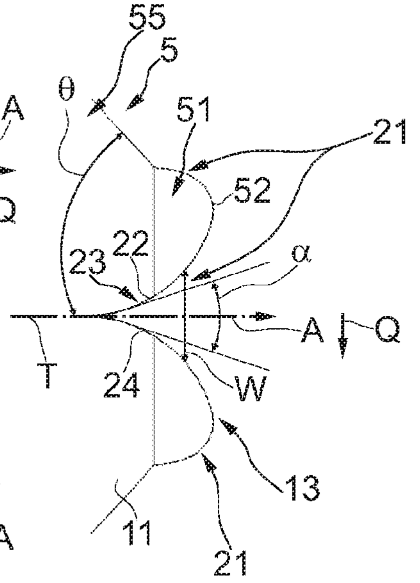
FIG. 1*d* shows a detailed top view onto the dispensing opening of the device according to FIG. 1*a* according to the section I of FIG. 1*b;*
Figure 1C:
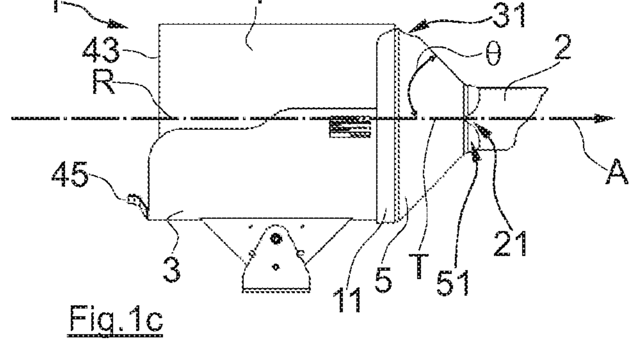
FIG. 1*c* shows a side view of the device according to FIG. 1*a;*

In the case of the embodiment of a packaging material dispenser 1 shown in FIGS. 1*a* to 1*c*, a paper web roll 4 is held in a cylindrical half shell-shaped receptacle 3, which is shaped so as to essentially have a complementary form to the outer circumferential of the paper web roll 4. In the circumferential direction U, the receptacle 3 surrounds the roll 4 with an overlap of approximately 180°, of between 160° and 200°. The paper web roll 4 is embodied to be coreless, in particular without cardboard core, and has a cylindrical inner cavity, which is formed by the innermost layer of the paper web. To produce packaging material, the innermost paper layer is drawn from the inner cavity of the roll 4, is pulled through the funnel-shaped inner contour 15 of the axial holder 5, and is provided through the dispensing opening 13 as spiral tubular packaging material 2, as is schematically illustrated in FIGS. 1*a* to 1*c*.

In the axial dispensing direction A, a forward orientation is defined by the dispensing direction of the packaging material 2, to which reference will be made below. With regard to the axial dispensing direction A, the axial holder 5 for holding the front end face 41 of the roll 4 is arranged at the front side of the receptacle 3. In the case of the embodiment depicted in FIGS. 1*a* to 1*c*, the rear end face 41 of the roll 4 faces in the direction of a rearward refilling opening side of the device 1. The receptacle 3 can essentially be opened completely at the refilling rear side of the device 1.

A supply nose 45, which protrudes inwards transversely to the axial direction A or transversely to the roll axis R, respectively, and which is curved convexly and extends over more than 15° and/or less than 90° in the circumferential direction, and which can be attached to the outer side of the roll 4 when reloading the device 1, is formed at the underside of the receiving shell 3 at the rearward opening thereof. A linear contact area between the outer side of the roll and the hollow-cylindrical shell body of the receptacle 3 can thus be avoided. The nose facilitates the insertion of the roll 4 into the receptacle 3 and avoids damages to the outer side of the roll.

When inserting the roll 4 into the receptacle 3, the user is urged to guide the end face 41 of the roll 4 all the way to the axial stop, which is formed by the funnel-shaped inner guide contour 15 of the axial holder 5. To facilitate this or to make this possible, respectively, a rear axial recess 31 is provided at the rearward end 53 of the axial holder 5. As can be seen in FIGS. 1*b* and 1*c*, the rear axial recess 31 provides sufficient space for the user, when inserting the roll 4 into the device, for producing and dispensing packaging material 2, in order to guide the front end face 41 of the roll 4 all the way to the inner contour 15 of the axial holder 5, without the hand of the user, which holds the roll 4, thereby coming into a direct contact with the wall 11 of the axial holder 5.

In the case of the embodiment of a rear axial recess 31 at the rearward end 53 of the axial receptacle 5 illustrated in FIG. 1*b*, an extension of the axial recess 31 in the direction of the axial dispensing direction A or in the direction of the roll axis R/funnel axis T, respectively, which coincide here, by approximately 5 cm to 10 cm is ensured, wherein the rear axial recess 31 extends in the circumferential direction along the base area 33 by more than 10 cm. At the base area 33 of the rear axial recess, thus in the front end region of the axial recess 31, the latter has an obtuse opening angle β with an extension of between 140° and 180°. Starting at the base section 33, the outer contour of the two lateral rims 32, 34, which are located opposite one another in the circumferential direction U, of the rear axial recess 31 runs so as to be continuously rounded, in order to largely rule out a risk of injury for the user.

Provided that the layers of the roll 4, which are wound around one another, are still in a static frictional state, as it is illustrated schematically in FIGS. 1*b* and 1*c*, the end face 41 of the roll 4 forms a flat or slightly conical end face 41 (i.e. with an opening angle or almost 180°), which, when inserting the roll 4 into the device 1, initially comes into direct contact with the guide contour 15 of the axial receptacle 5 along its outer circumference at the end face. At the moment of the first contacting of the circumferential outer edge of the roll 4 at the end face with the guide contour 15 of the axial receptacle 5, the rear axial recess 31 in the axial dispensing direction or the funnel axis T or roll axis R, respectively, coinciding therewith in the case of the embodiment according to FIGS. 1*a* to 1*d*, provides a sufficient distance of 1 cm to approximately 5 cm for the hand of the user.

The shell-shaped receptacle 3 can be made in one piece of a cylindrical shell-shaped thin wall, for example of plastic, with a wall thickness of up to 5 mm or less. It is conceivable that the receptacle 3 may include a different material, for example sheet metal. The roll 4 and the receptacle 3 may be dimensioned to match one another in such a way that they are formed so as to essentially have a complementary form, for example circularly and/or are formed coaxially or virtually coaxially to one another, respectively, wherein a deviation of the concentricity of a few centimeters, for example 0.5 cm to 3 cm, can be tolerable.

At the front end of the receptacle 3 in the axial direction A, the axial holder 5 connects directly, to the embodiment depicted in FIGS. 1*a* to 1*c*. The entry area 30 of the axial holder 5 has an essentially cylindrical base cross section, from which the frustoconical inner guide contour 15 tapers rotationally symmetrically around the funnel axis T in the direction of the dispensing opening 13. Starting at the receptacle 3, the inner guide contour 15 runs all the way to the dispensing opening 13 without obstacles. The axial holder 5 may include integrally of a single part, for example an injection molded plastic part or a part made of several plastic components. The axial holder 5 has a wall 11, which can have an essentially constant wall thickness of 1 mm to 5 mm along the complete axial extension of the axial holder 5. Hollow-cylindrical sleeve or collar sections 51, 57, respectively, which extend exclusively in the axial direction A or in the direction of the funnel axis T, respectively, can be formed at the front end 52 and at the rear end 53, axially adjacent to the funnel-shaped section of the wall 11, which forms the inner guide contour 15. The collar 57 provided at the rearward end 53 of the wall 11 of the axial holder 5 can extend, for example, circumferentially along the outer side of a shell-shaped receptacle 3 in the circumferential direction U, as can be seen, for example, in FIGS. 1*a* and 1*c*, and can comprise assembly elements for attaching the axial holder 5 to the receptacle 3.

Several axial recesses 21, which extend rearward in the axial direction A, starting at the front end 52 of the wall 11, are provided at the front end 52 of the axial holder 5. Four front axial recesses 21 are provided at the front end 52 of the wall 11 so as to be distributed evenly in the circumferential direction U, as can be seen particularly well in FIG. 1*a*. A front axial recess 21 is designed to provide the user with a certain space for reaching inside the axial holder 5, towards the layers of the roll 4 on the inner side, which limit the inner cavity. The user can thus simply pull out the inner layers of the roll 4 through the dispensing opening 13 and can form a spiral tubular packaging material 2. The front axial recesses 21 in the wall 11 are further formed to act as tear-off aid for severing individual packaging material units, for example packaging material cushions, from the packaging material tube 2. For this purpose, an axial recess 21 can be formed, for example as in the detailed illustration according to FIG. 1*d*.

According to FIG. 1*d*, the front axial recess 21 or removal and/or tear-off axial recess 21, respectively, extends to the rear over at least 10 mm, approximately 30 mm to 100 mm, in the axial direction A, starting at the front end 52 of the axial holder 5 in the axial dispensing direction A. At the rear end of the front axial recess 21 in the axial dispensing direction A, it forms a narrow clamping section 23. The clamping section 23 forms the base of the removal and tear-off axial recess 21 on the side of the receptacle. In the clamping section 23, the front axial recess 21 is initially designed with an acute opening angle α in the range of between 5° and 45°. The opening width of the acute angle α can lie in the range of between 20° and 35°. Starting at the clamping section 23 of the axial recess 21, the wall 11 extends forward in the axial direction A along a right and left leg or a right outer edge 22 and a left outer edge 24, respectively, between which the acute opening angle α is defined. The outer edges 22 and 24 are located opposite one another in the circumferential direction U. The outer edges can be designed in such a way that they run along a continuous curvature path all the way to the front end 52 of the axial holder 5. A, for example left, outer edge 22 of a first axial recess 21 transitions into the right outer edge 24 of an adjacent, second axial recess 21, continuously, in particular in a rounded manner, at the front end 52 of the axial holder 5.

In the case of an embodiment of a packaging material production device 1 comprising an axial holder 5, the wall 11 of which has two or more axial recesses 21 (for example according to FIGS. 10*a* to 10*d*), beak-like wall sections or beaks 12, respectively, are formed between the axial recesses 21. In the case of the device 1 depicted in FIGS. 1*a* to 1*d*, the wall 11 forms four beaks 12, which are adjacent to one another in the circumferential direction U, wherein a removal and/or tear-off axial recess 21 in the manner of the corner of a mouth is formed between two respective adjacent beaks 12.

Starting at the clamping section 23 of the axial recess 21, the width w of the axial recess 21 increases in the circumferential direction U. The widest distance W in the circumferential direction U between outer edges 22, 24, which are located opposite one another in the circumferential direction U, is formed in the area of the front end 52, and the narrowest opening width w of the front axial recess 21 is formed in the end area of the clamping section 23 on the side of the receptacle, where a radius transition between left and right outer edge 22, 24 can be provided.

The axial recess can be formed exclusively in the cylindrical sleeve-shaped front collar section 51 of the receptacle 3. In the case of an embodiment of this type (which is not illustrated in more detail), the front axial recess 21 extends purely axially within the wall 11. According to the embodiment illustrated for example in FIGS. 1*a* to 1*d*, the tear-off axial recess 21 expands within the front collar section 51 as well as in the funnel section 55, which forms the inner guide contour 15, which tapers in a funnel-shaped manner. In the wall 11, the axial recess 31, which extends in the collar section 51 as well as in the funnel section 55, thus does not only extend in the axial direction A, but also transversely to the axial direction A in the radial direction Q.

Figure 2A:
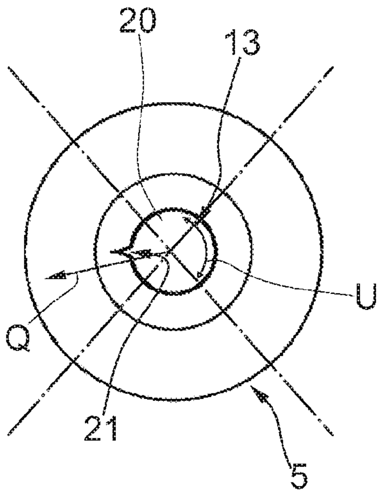
FIG. 2*a* shows a front view of an axial holder for a packaging material dispensing device according to a second embodiment according to the invention.
Figure 2B:
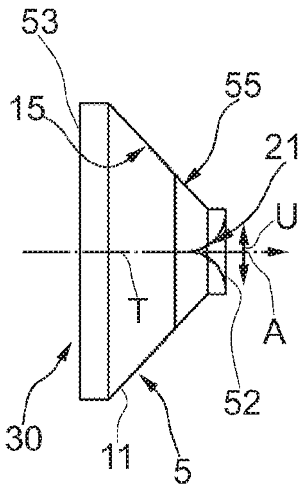
FIG. 2*b* shows a side view of the axial holder according to FIG. 2*a;*
Figure 2C:
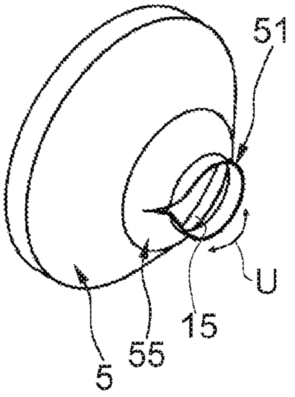
FIG. 2*c* shows a perspective view of the axial holder according to FIG. 2*a;*

FIGS. 2*a* to 2*c* show a different embodiment of an axial holder 5 for a device according to the invention for producing packaging material 1 according to a second embodiment. The axial holder 5 according to FIGS. 2*a* to 2*c* differs from the example described with regard to FIG. 1 in that only a single front removal and/or tear-off axial recess 21 is introduced into the wall 11 of the axial holder 5. The front collar section 51 of the axial holder 5, which extends around a majority (approx. 270°) of the dispensing opening 13 in the circumferential direction U, can be seen in FIG. 2*c*. As in the case of the above-described exemplary embodiment, the axial recess 21 extends through the collar section 51 in the axial direction A as well as with radial and axial components into the funnel section 55, which provides the axial holder 5 of the inner guide contour 15. The inner guide contour 15 of the axial holder 5 illustrated in FIGS. 2*a* to 2*c* is essentially identical to the inner guide contour 15 of the embodiment illustrated in FIGS. 1*a* to 1*d*. As above, the funnel axis T and the dispensing axis A are coaxial to one another. The inner guide contour 15 forms a frustoconical inner side surface of the axial holder 5 around the funnel axis T, which, starting at the entry area 30, extends with circular cross section towards the passage surface 20, which is likewise formed in a circular manner (with the exception of the nose-like contour of the front axial recess). (A rearward insertion axial recess can optionally be provided additionally (not illustrated in more detail) in the case of the axial holders 5 provided in FIGS. 2*a* to 2*c*).

Figure 3A:
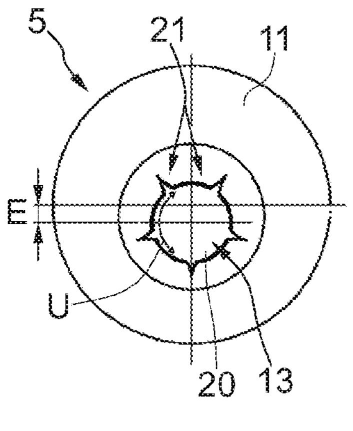
FIG. 3*a* shows a front view of an axial holder for a packaging material dispensing device according to a third embodiment according to the invention.
Figure 3B:
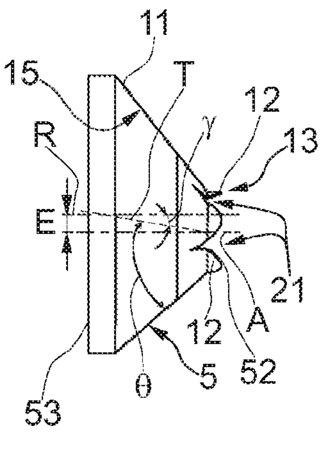
FIG. 3*b* shows a side view of the axial holder according to FIG. 3*a;*
Figure 3C:
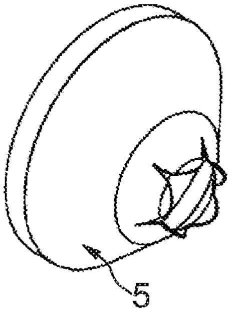
FIG. 3*c* shows a perspective view of the axial holder according to FIG. 3*a;*

A third embodiment of an axial holder 5 according to a third embodiment of a device 1 according to the invention for producing packaging material is illustrated in FIGS. 3*a* to 3*c*. In contrast to the two above-illustrated embodiments, the axial dispensing direction A in the case of the third embodiment is offset in parallel eccentrically by a distance E relative to the roll axis R.

The embodiment according to FIGS. 3*a* to 3*c* moreover differs from the above-described embodiments in that five evenly distributed removal and/or tear-off axial recesses 21 are provided at the front end 52 of the axial holder 5. Between the axial recesses 21, the axial holder 5 forms five beaks 12. The funnel-shaped inner contour 15 of the axial holder 5 according to FIGS. 3*a* to 3*c* runs rotationally symmetrically around the funnel axis T and relative to the roll axis R and the dispensing axis A in the form of an oblique truncated cone. Compared to the parallel alignments of dispensing axis A and roll axis R, the funnel axis T is tilted by an angular offset γ, which lies between 5° and 10° in the embodiment illustrated in FIGS. 3*a* to 3*c*. An embodiment of this type of the axial stop 5 is suited particularly for the case that the axial dispensing direction is arranged so as to be inclined downwards relative to a vertical direction running in the gravity direction (not illustrated in more detail) with respect to a horizontal direction (not illustrated in more detail), so that the gravity exerts an effect, which pulls down and out, on the windings of the roll 4. The axial stop 5 can then be positioned in such a way that the roll axis R and the axial dispensing direction A are not aligned, but are offset to one another, so that the axial stop 5 exerts an increased resistance against an involuntary movement of the packaging material 2 by the effect of the gravity. An undesired slipping of the paper web material of the roll 4 from the packaging material production and dispensing device 1 can thus be avoided.

Figures 4A, 4B, 4C:
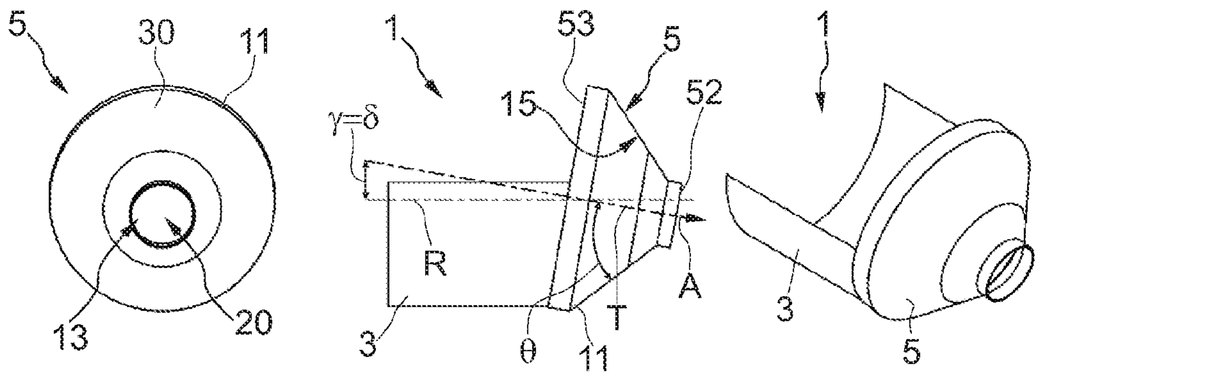
FIG. 4*a* shows a front view of a packaging material dispensing device according to the invention according to a fourth embodiment.
FIG. 4*b* shows a side view of the packing material dispensing device according to FIG. 4*a;*
FIG. 4*c* shows a perspective view of the packaging material dispensing device according to FIG. 4*a;*

A fourth embodiment according to the invention of a packaging material dispenser or of a device for manually or mechanically producing a tubular packaging material, respectively, is depicted in FIGS. 4*a* to 4*d*. The illustration of a roll is forgone thereby. As can be seen in FIG. 4*b*, the axial dispensing direction A and the funnel axis T run coaxially to one another and are tilted by an angle γ or σ, respectively, relative to the roll axis R in the case of this fourth embodiment. To simplify matters, no axial recesses are depicted at the front 52 or rear 53 rim of the axial holder 5 in the case of the embodiment according to FIGS. 4*a* to 4*c*, but they can optionally be present. Similarly as in the case of the embodiments according to FIGS. 3*a* to 3*c*, the (angular) offset σ between the axial dispensing direction A and the roll axis R in the case of the embodiment according to FIGS. 4*a* to 4*c* has the advantageous effect that even in the case of an orientation of the roll axis R, which is tilted relative to the horizontal direction, an involuntary slip-out of packaging material through the dispensing opening 13 is prevented by means of the additional resistance provided by the axial holder 5.

Figures 5A, 5B, 5C:
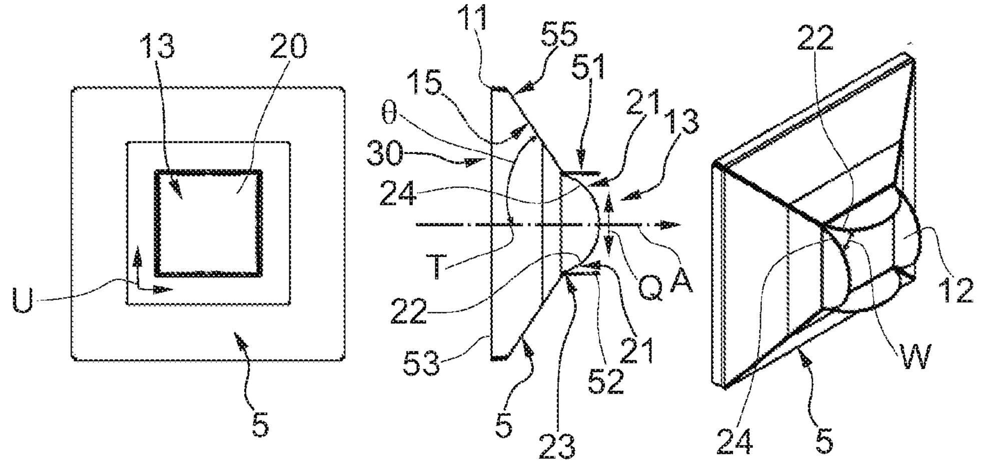
FIG. 5*a* shows a front view of an axial holder for a packaging material dispensing device according to a fifth embodiment according to the invention.
FIG. 5*b* shows a side view of the axial holder according to FIG. 5*a;*
FIG. 5*c* shows a perspective view of the axial holder according to FIG. 5*a;*

FIGS. 5*a* to 5*c* show a fifth embodiment of an axial holder 5. As does the axial holder illustrated in FIGS. 1*a* to 1*d*, it has four removal and tear-off axial recesses 21 in its wall 11. In contrast to the above-depicted embodiments, an essentially square entry cross section is provided at the entry area 30 of the axial holder 5 according to FIGS. 5*a* to 5*c*, starting at which a truncated pyramid-shaped inner contour 15 extends to an essentially square passage surface 20. As described above, the receptacle, which is not illustrated in more detail here, can optionally be shaped as semi-cylindrical shell-shaped receptacle or can be formed so as to be form-adapted to the square base area of the axial holder 5, for example by a V-shaped cross section or by support beams, which are parallel to the roll axis R.

As can be seen in FIGS. 5*b* and 5*c*, the four axial recesses 21 are formed at the front collar section 51 of the axial holder in the axial dispensing direction A and extend exclusively in the axial direction A and in the circumferential direction U. In the case of the embodiment according to FIGS. 5*a* to 5*c*, the collar section 51 has a square cross section. The collar section 51 is flush with the truncated pyramid-shaped funnel section 55. In the case of this embodiment, the axial holder 5 is also formed with a constant wall thickness of the wall 11. The beaks 12 of the axial holder 5 according to FIGS. 5*a* to 5*c* are flat and extend parallel to the lateral edges of the base area or of the passage surface 20, respectively, at the rims of the dispensing opening 13. The clamping section 23 is formed in the corner areas between the collar section 51 and the pyramid section 55 of the axial holder 5, and the axial recess 21 increasingly enlarges its width w, starting at the clamping section 23, along the axial dispensing direction A. In the case of the axial holder 5 comprising a square cross section, an insertion axial recess (not illustrated in more detail) can also be provided at the rear end of the wall 11.

A sixth embodiment of an axial holder 5 is illustrated in FIGS. 6*a* to 6*d* for a further embodiment of a device according to the invention. For an easier viewing, axial recesses, which can be optionally introduced, are not illustrated in the fully cylindrical collar area 51 at the front end 52 of the axial holder 5 in the case of the axial holders 5 according to FIGS. 6*a* to 6*d*.

The axial holder 5 according to FIGS. 6*a* to 6*d* has a stepped rear axial recess 31, which, starting at the rear rim 53, extends forwards into the wall 11 axially in the axial dispensing direction A or in the direction of the roll axis R, respectively, and the funnel axis T, which is arranged coaxially thereto according to this embodiment. A step 35 is in each case provided at the left rim 32 in the circumferential direction U and at the right rim 34 of the rear axial recess 31 in the circumferential direction U. Between the steps, a base section 33 of the rear axial recess 31 extends in a curved manner over more than half of the circumferential width of the recess 31. According to the top view depicted in FIG. 6*c*, the opening angle β lies between 180° and 160°, at 170°. The step sections 35 form a defined attachment or stop point, respectively, for the circumferential end of the roll 4 at the end face (not illustrated in more detail), similarly as in FIG. 1, wherein this defined attachment point provides sufficient space, that is at least 1 cm to for example 5 cm, for engaging with the hand of the user, for the circumferential edge of the roll end face 41, starting in the axial dispensing direction A or along the funnel axis T/roll axis R, respectively.

The step 35 is provided in the area of the transition between the frustoconical funnel section 55 and the cylindrical sleeve-shaped rear collar section 57 of the axial holder 5. The rear collar section 57 forms the rear end 53 of the axial holder 5 in a partially circular manner and can, as described above with regard to FIG. 1, have assembly components for connection to the receptacle 3. It is in particular possible that the rear collar 57 of the axial holder 5 is slipped over a receptacle 3 of essentially complementary form with a smaller cross sectional width, in particular with a smaller diameter than that of the entry area 30 of the axial holder 5.

With the exception of the step 35, the rear axial recess 31 essentially corresponds to the embodiment illustrated in FIGS. 1*a* to 1*c*. As in the case of the embodiment illustrated in FIGS. 1*a* to 1*c*, the axial holder 5 has an essentially frustoconical inner funnel contour 15, which runs rotationally symmetrically around the funnel axis T, which is oriented coaxially to the roll axis R and to the axial dispensing direction A. As in the case of the above-described embodiment with regard to FIGS. 1*a* to 1*c*, the rear axial recess 31 according to FIGS. 6*a* to 6*d* does not only extend into the rear collar section 57 in the axial direction, but furthermore forwards and rearwards into the funnel section 55 with axial as well as with radial components. In the case of the embodiment according to FIGS. 6*a* to 6*d*, the wall thickness of the wall 11 is essentially also constant.

The axial holder 5, which is depicted in FIGS. 7*a* to 7*d*, essentially differs from the embodiment according to FIGS. 6*a* to 6*d* in that two insertion axial recesses 31, which are located opposite one another in a mirror-symmetrical manner, are provided in the rear end 53 of the axial holder 5. The provision of several axial recesses 31 allows for a simpler insertion of the roll (not illustrated in more detail) into the receptacle of the device 1 equally from both sides laterally to the device 1.

To avoid an undesired weakening of the axial holder 5 by the introduction of the rear axial recesses 31 (or also front axial recesses, which are not illustrated in detail here), ribs, which extend parallel in the axial dispensing direction A or in the direction of the funnel axis T, respectively, can be provided at the axial holder 5 on the outer side (not illustrated in more detail).

The opening angle β suggested in the side view according to FIG. 7*b* at the base 33 of the axial receptacle 31 has an opening width of more than 90°, for example between 95° and 120°, so that an acute-angled contact between opposite rims 32, 34 at the base 33 of the recess 31 is avoided.

A face plate 36, which extends by less than half around the funnel axis T in the circumferential direction U, is provided between the two rear axial recesses 31. A step 35, which is formed similarly to the steps described above with regard to FIGS. 6*a*/6*d* in the transition area between collar 57 and funnel section 55 on the side of the receptacle, is provided at the rim 32 or 34, respectively, which is in each case formed opposite to the face plate 36.

FIGS. 8*a* to 8*d* show a further alternative of an axial holder 5 for a device 1 according to the invention. Similarly as in the case of FIGS. 4*a* to 4*c*, the optional front axial recess and rear axial recess was forgone to simplify the illustration. In the embodiment illustrated in FIGS. 8*a* to 8*c*, the dispensing opening 13 is arranged eccentrically relative to the roll axis R in such a way that the roll axis R does not intersect the passage opening 20 of the dispensing opening 13. In particular for packaging material dispensers 1, which are aligned obliquely or even vertically, an embodiment of this type may prevent the packaging material unintentionally sliding out of the device 1. The axial dispensing direction A can be provided specifically with regard to a predetermined orientation of a packaging station (not depicted in more detail).

Figure 8A:
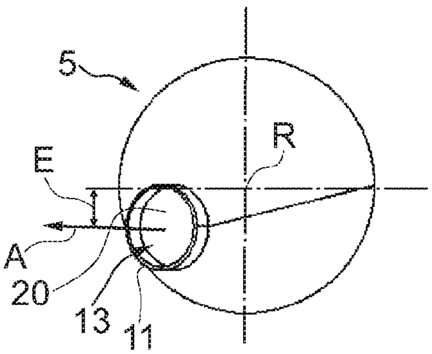
FIG. 8*a* shows a front view of an axial holder for a packaging material dispensing device according to an eight embodiment according to the invention.
Figure 8B:
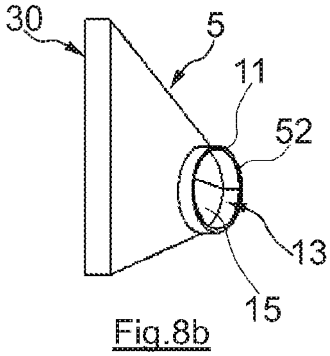
FIG. 8*b* shows a side view of the axial holder according to FIG. 8*a;*
Figure 8D:
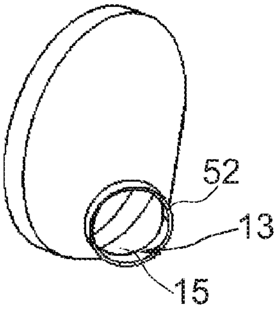
FIG. 8*d* shows a perspective view of the axial holder according to FIG. 8*a;*
Figure 8C:
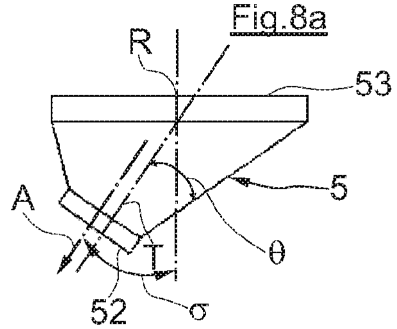
FIG. 8*c* shows a top view onto the axial holder according to FIG. 8*a;*
Figure 9A:
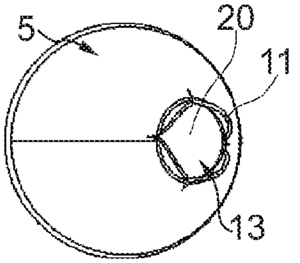
FIG. 9*a* shows a front view of an axial holder for a packaging material dispensing device according to a ninth embodiment according to the invention.
Figure 9B:
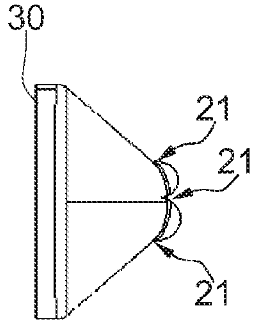
FIG. 9*b* shows a side view of the axial holder according to FIG. 9*a;*
Figure 9D:
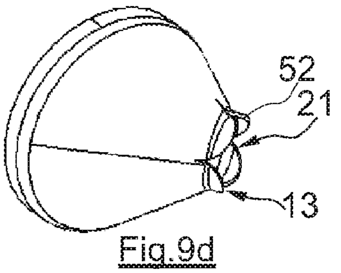
FIG. 9*d* shows a perspective view of the axial holder according to FIG. 9*a;*
Figure 9C:
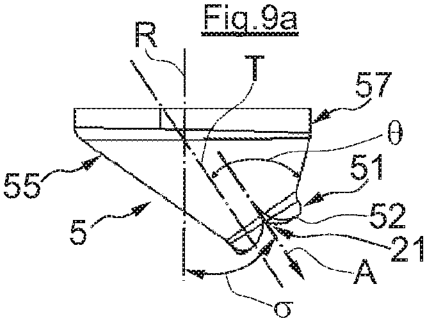
FIG. 9*c* shows a top view onto the axial holder according to FIG. 9*a;*

With respect the roll axis R, the axial dispensing direction A is offset about an angular offset σ, as is shown by the top view according to FIG. 8*c*. An eccentricity E between the roll axis R and the dispensing axis A is further provided perpendicular to the top view 8*c*, as illustrated schematically in FIG. 8*a*. The funnel axis T runs parallel to the dispensing axis A and forms an inner funnel contour 15 according to an oblique cone relative to the roll axis R.

The embodiment of an axial holder 5 according to FIGS. 9*a* to 9*d* essentially differs from the embodiment described with regard to FIGS. 8*a* to 8*d* in that the axial dispensing direction A is provided without the vertical eccentricity relative to the roll axis R depicted in FIG. 8*a*. In the case of the embodiment according to FIGS. 9*a* to 9*d*, however, an angular offset σ is also provided between the axial dispensing direction A and the roll axis R, as is shown by the top view according to FIG. 9*c*.

Similarly as the axial holder 5 according to FIGS. 1*a* to 1*d*, the axial holder 5 has four removal and tear-off axial recesses 21 in its wall 11 according to FIGS. 9*a* to 9*d*, which extend mainly in the front collar area 51. As in the embodiment according to FIGS. 8*a* to 8*d*, the axial dispensing direction A is offset parallel to the funnel axis T in the case of the embodiment according to FIGS. 9*a* to 9*d*. In the case of FIGS. 9*a* to 9*d*, the funnel axis T is also angled relative to the roll axis R, so that the inner guide contour 15, which is formed rotationally symmetrically around the funnel axis T, has an oblique cone shape with respect to the roll axis R. In the case of the embodiments according to FIGS. 8*a* to 8*d* as well as in the case of the embodiment according to FIGS. 9*a* to 9*d*, the oblique funnel nonetheless maintains a steadily tapering inner contour 15 with respect to the roll axis R. The rear collar section 57 of the embodiment according to FIGS. 8*a* to 8*d* and 9*a* to 9*d* extends coaxially to the roll axis R in a cylindrical sleeve-shaped manner. If a rear axial recess 31 (not illustrated in more detail) is introduced in the case of an embodiment described in FIGS. 8*a* to 8*d* or 9*a* to 9*d*, a rotationally symmetrical design of the rear axial recess with respect to the roll axis R would be conceivable.

Figure 10A:
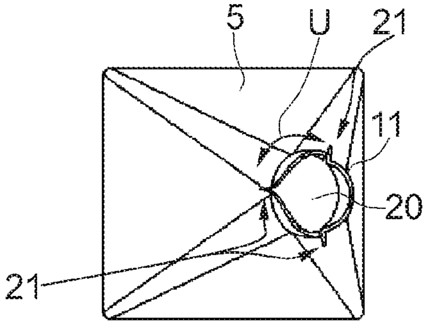
FIG. 10*a* shows a front view of an axial holder for a packaging material dispensing device according to a tenth embodiment according to the invention.
Figure 10B:
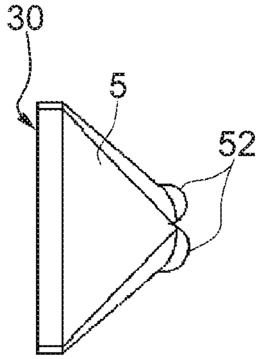
FIG. 10*b* shows a side view of the axial holder according to FIG. 10*a;*
Figure 10D:
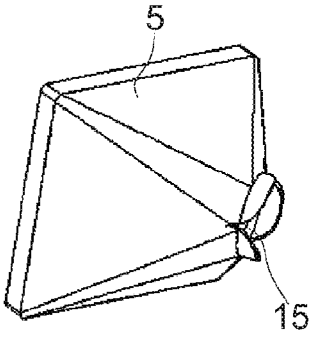
FIG. 10*d* shows a perspective view of the axial holder according to FIG. 10*a;*
Figure 10C:
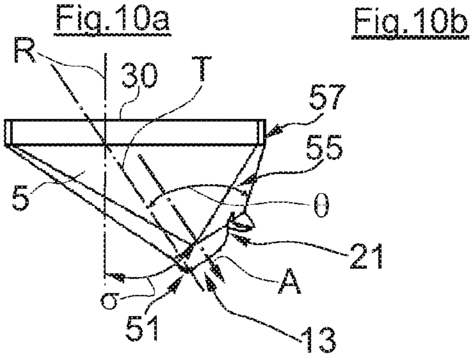
FIG. 10*c* shows a top view onto the axial holder according to FIG. 10*a;*

In the case of the embodiment according to FIGS. 10*a* to 10*c*, the axial holder 5 for a packaging material dispensing device 1, which is not illustrated in more detail, has an essentially square cross section in the entry area 30. The passage surface 20 at the dispensing opening 13 is essentially circular with nose-like appendages in the form of the front axial recesses 21. As can be seen in FIG. 10, the axial holder 15 is equipped with three uniform tear-off axial recesses 21, which are distributed in the circumferential direction U and which are formed in the wall 11. The thickness of the wall 11 is essentially constant. The axial dispensing direction A is parallel to the funnel axis T and offset by the angle σ with respect to the roll axis R. The roll axis R intersects the square entry cross section essentially perpendicularly in the opening area 30. The dispensing axial direction A is perpendicular to the passage surface 20 of the dispensing opening 13. Starting at the square cross section at the entry 30 of the axial holder 5, the funnel-like inner guide contour 15 in the funnel section 55 of the axial holder 51 extends in a pyramid-like manner in the axial dispensing direction A. The funnel or pyramid axis T, respectively, is in each case still oriented centrally, obliquely in the axial dispensing direction relative to the roll axis R.

Figure 11A:
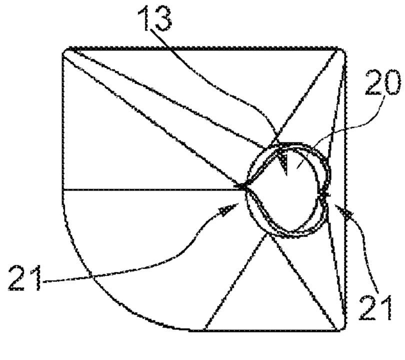
FIG. 11*a* shows a front view of an axial holder for a packaging material dispensing device according to an eleventh embodiment according to the invention.
Figure 11B:
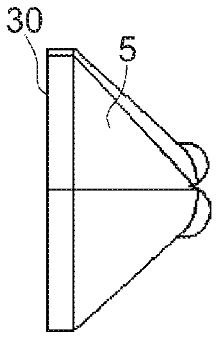
FIG. 11*b* shows a side view of the axial holder according to FIG. 11*a;*
Figure 11D:
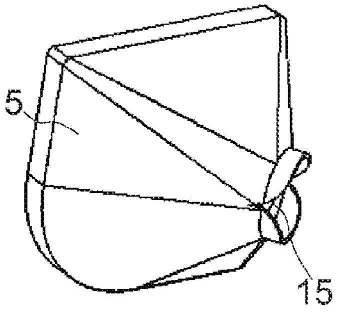
FIG. 11*d* shows a perspective view of the axial holder according to FIG. 11*a*.
Figure 11C:
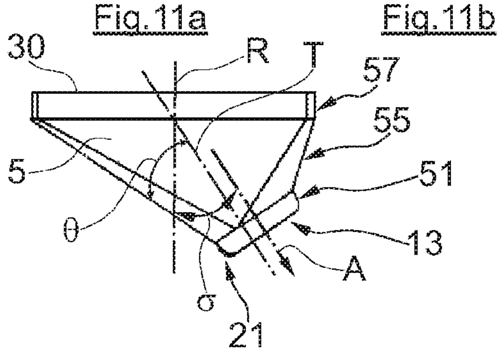
FIG. 11*c* shows a top view onto the axial holder according to FIG. 11*a*.

On the one hand, the embodiment illustrated in FIGS. 11*a* to 11*c* differs from the embodiment according to FIGS. 10*a* to 10*d* by the smaller number of only two diametrically opposite axial recesses 21, which are arranged around the dispensing opening 13. On the other hand, the base area in the entry area is designed with two rectangular lateral edges and with two lateral rims, which are connected in the shape of a quadrant. Starting at this base form, the inner guide contour 15 extends essentially in a pyramid-shaped manner from the entry 30 to the passage opening 20, similarly as in the case of the embodiment according to FIGS. 10*a* to 10*d*. The funnel axis T or pyramid axis, respectively, defined by the funnel section 55 is offset slightly parallel with respect to the axial dispensing direction A and is offset by the angle σ with respect to the roll axis R. As above, the roll axis R intersects the entry cross section approximately centrally and perpendicularly. The dispensing axis A is central and/or perpendicular to the passage opening 20.

The features disclosed in the above description, the figures, and the claims, can be significant for the realization of the invention in the various designs, both individually and in any combination.

LIST OF REFERENCE NUMERALS

1 device for producing packaging material
2 packaging material
3 receptacle
4 roll
5 axial holder
11 wall
12 beak
13 dispensing opening
15 inner guide contour
20 passage surface
21 front axial recess
22, 24 outer edge
23 clamping section
30 entry area
31 rear axial recess
32, 34 rim
33 base section
35 step
36 face plate d
41 front end face
43 rear end face
45 nose
51 front collar section
52 front end
53 rear end
55 funnel section
57 rear collar section
A axial dispensing direction
E eccentricity
Q radial direction R roller axis
T funnel axis
U circumferential direction
w width
α acute opening angle
β obtuse opening angle
γ angular offset (R/T)
σ angular offset (R/A)

We claim:

1. A device for manually or mechanically producing a tubular packaging material of a paper web wound to form a roll, which forms an internal cavity, from which the paper web can be drawn to form the packaging material, the device comprising:

- a receptacle for at least partially circumferentially encompassing the roll; and
- an axial holder for holding an end face of the roll, wherein the axial holder has a wall, in which a dispensing opening for dispensing the packaging material in an axial dispensing direction (A) is formed, wherein the wall:
  - has an inner guide contour, which tapers in a funnel-like manner in the axial dispensing direction (A) from the receptacle to the dispensing opening, and
  - is provided with:
    - at least one rear axial recess at a rear end of the axial holder in the axial dispensing direction (A), and
    - at least one front axial recess at a front end of the axial holder in the axial dispensing direction (A), which extends at least 10 millimeters in the axial dispensing direction (A), starting at the front end of the axial holder.

2. The device according to claim 1, wherein the wall for forming the at least one front axial recess bifurcates in the circumferential direction (U) and transversely to the axial dispensing direction (A) such that the width (w) of the front axial recess increases transversely to the axial dispensing direction (A) in the course of the axial recess in the axial dispensing direction (A).

3. The device according to claim 2, wherein the at least one front axial recess defines an acute opening angle (a) at least in a rear clamping section in the axial dispensing direction (A).

4. The device according to claim 3, wherein the outer edges of the wall located opposite one another in the circumferential direction, which limit the one front axial recess, run in a curved continuously rounded manner, such that the circumferential width (w) of this axial recess increases continuously in the axial dispensing direction (A).

5. The device according to claim 4, wherein the front end of the axial holder is formed by continuously rounded outer edges, wherein outer edges adjoining one another transition into one another continuously with constant curvature.

6. The device according claim 1, wherein:

- the inner guide contour of the wall runs continuously in the axial dispensing direction (A), and is free from jumps or edges in the axial dispensing direction (A) starting at the front end of the axial holder to the receptacle, to connect directly to the receptacle,
- the wall includes sections, and in the axial dispensing direction (A), the inner guide contour runs linearly in the sections or runs with a curvature in the sections, the radius of curvature of which being least 1 cm, and
- the sections which are linear in the axial dispensing direction and the sections that are curved in the axial dispensing direction transition continuously into one another free from steps, kinks, and jumps.

7. The device according to claim 1, wherein the wall comprises two or more front axial recesses arranged at the front end of the axial holder in the axial dispensing direction (A).

8. A device for manually or mechanically producing a tubular packaging material of a paper web wound to form a roll, which forms an internal cavity, from which the paper web can be drawn to form the packaging material and defines a roll axis (R), the device comprising:

- a receptacle for at least partially circumferentially encompassing the roll; and
- an axial holder for holding an end face of the roll, wherein the axial holder has a wall, in which a dispensing opening for dispensing the packaging material in an axial dispensing direction (A) is formed, wherein the wall includes:
- inner guide contour, which tapers in a funnel-like manner in the axial dispensing direction (A) from the receptacle to the dispensing opening, the axial dispensing direction (A) being aligned transversely to the roll axis (R), and
- at least one rear axial recess at a rear end of the axial holder in the axial dispensing direction (A).

9. The device according to claim 8, wherein the wall defines a funnel axis with the inner guide contour, which tapers in a funnel-like manner, wherein a funnel opening angle (θ) of at least 15° or maximally 75° is spanned between the funnel axis (T) and the inner guide contour.

10. The device according to claim 9, wherein the funnel axis (T) runs angled relative to the roll axis (R).

11. The device according to claim 10, wherein the axial dispensing direction (A), which intersects the dispensing opening in the center, is arranged offset and at an angle relative to the funnel axis (T).

12. The device according to claim 11, wherein the dispensing opening, which is surrounded by the wall, forms a circular passage surface perpendicular to the axial dispensing direction (A), which is arranged eccentrically relative to the roll axis (R), wherein the roll axis (R) does not intersect the passage surface.

13. The device according to claim 8, wherein the wall further comprises at least one front axial recess at a front end of the axial holder in the axial dispensing direction (A).

14. A device for manually or mechanically producing a tubular packaging material of a paper web wound to form a roll, which forms an internal cavity, from which the paper web can be drawn to form the packaging material, the device comprising:

- a receptacle for at least partially circumferentially encompassing the roll; and
- an axial holder for holding an end face of the roll, wherein the axial holder has a wall, in which a dispensing opening for dispensing the packaging material in an axial dispensing direction (A) is formed, wherein the wall:
  - has an inner guide contour, which tapers in a funnel-like manner in the axial dispensing direction (A) from the receptacle to the dispensing opening, and
  - is provided with at least one rear axial recess at a rear end of the axial holder in the axial dispensing direction (A), which extends at least 10 millimeters in the axial dispensing direction (A), starting at the rear end of the axial holder.

15. The device according to claim 14, wherein the at least one rear axial recess has an obtuse opening angle (β) in a front base section in the axial dispensing direction (A).

16. The device according to claim 15, wherein the wall limiting the at least one rear axial recess has at least one step, which protrudes in the circumferential direction, between the base section and the rear end of the axial holder.

17. The device according to claim 14, wherein the at least one rear axial recess has an access section, which extends over at least 10 millimeters in the axial direction (A) and the rims of this rear axial recess, which are located opposite one another in the circumferential direction, are spaced apart from one another by no less than 50 millimeters in the circumferential direction.

18. The device according to claim 14, comprising at least two rear axial recesses, wherein the at least two rear axial recesses are arranged rotationally symmetrically.

19. The device according to claim 14, wherein the at least one rear axial recess extends at least 20 millimeters in the axial dispensing direction (A).

20. The device according to claim 14, wherein the at least one rear axial recess extends at least in some sections in a radial direction (R) transversely to the axial dispensing direction (A).

21. The device according to claim 14, wherein the axial holder defines an essentially rectangular funnel base cross section in its entry area on the receptacle side.

* * * * *